May 7, 1935.  A. G. ENOCK  2,000,514
APPARATUS FOR PASTEURIZING MILK AND OTHER SUBSTANCES
Filed Jan. 22, 1934   3 Sheets-Sheet 1
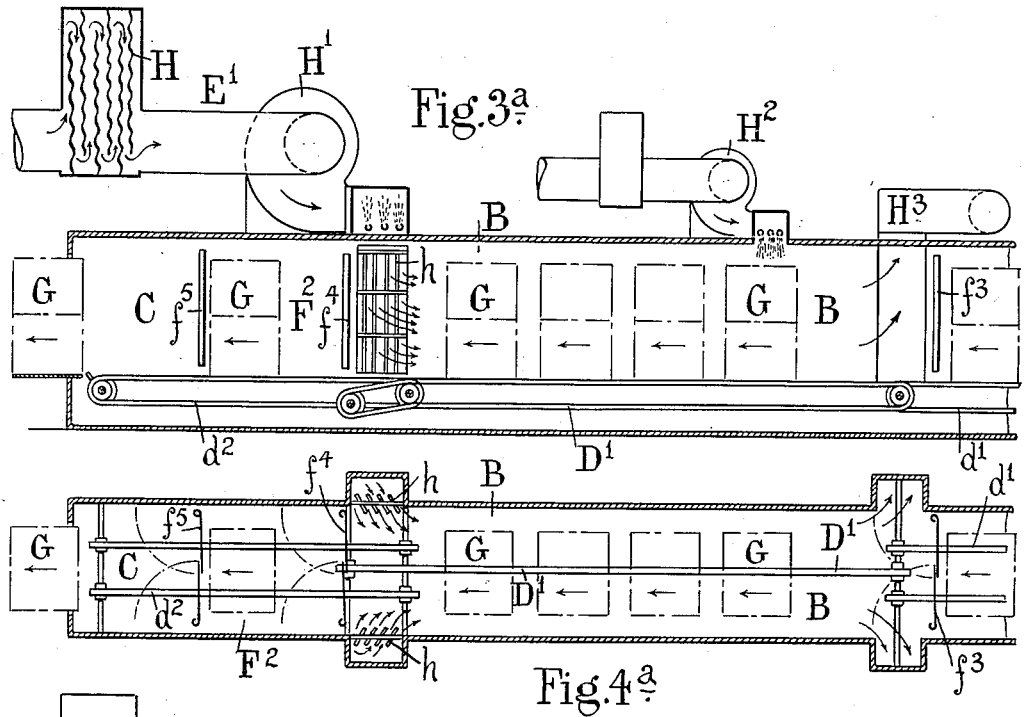
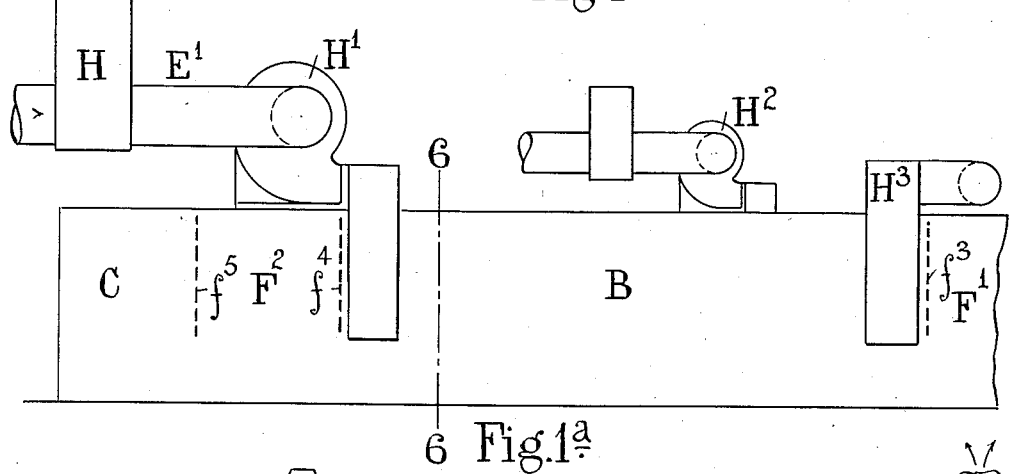
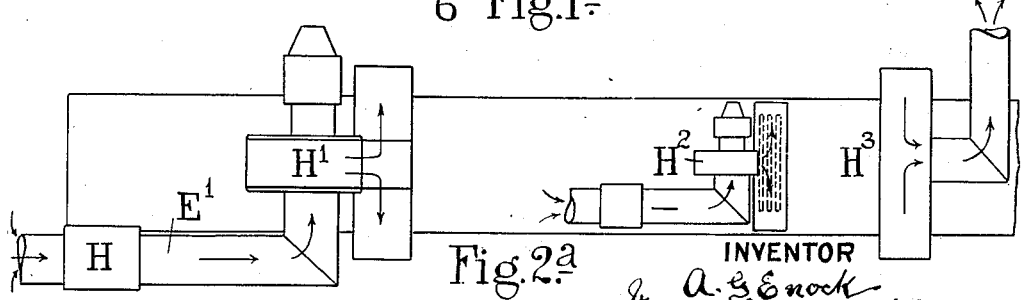

May 7, 1935.  A. G. ENOCK  2,000,514
APPARATUS FOR PASTEURIZING MILK AND OTHER SUBSTANCES
Filed Jan. 22, 1934    3 Sheets-Sheet 2
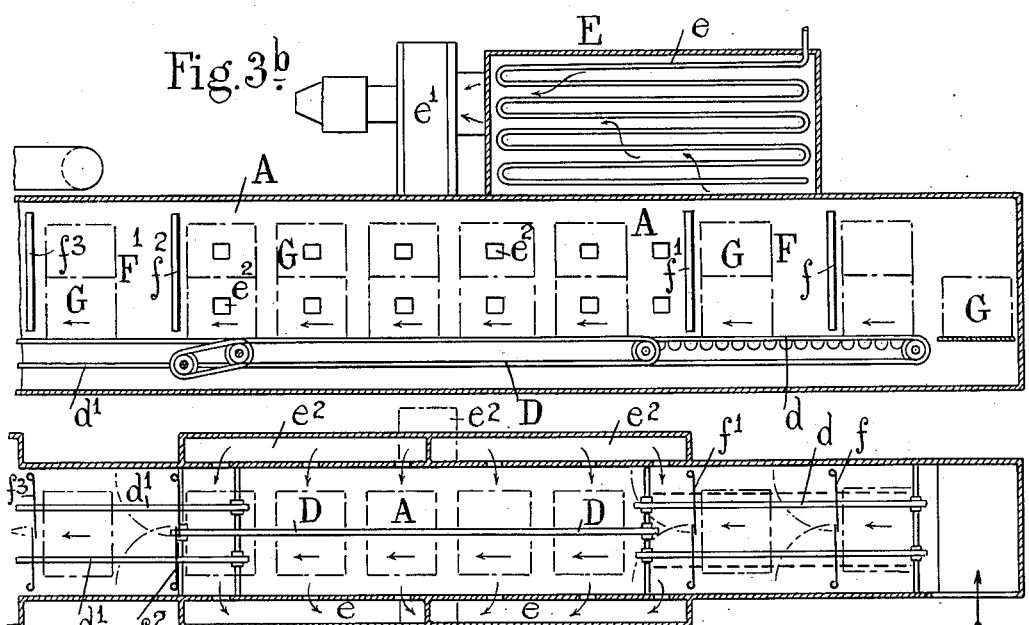
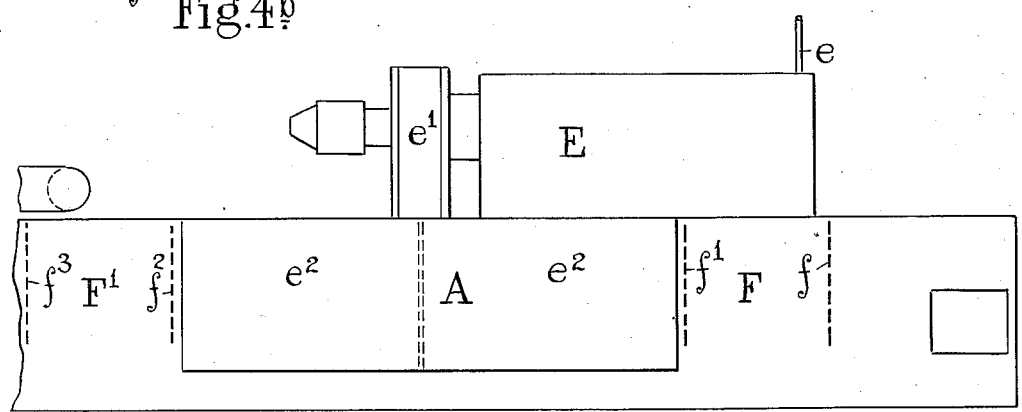
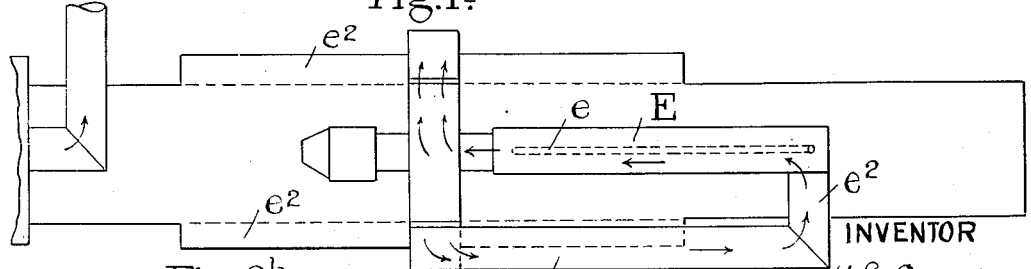
INVENTOR

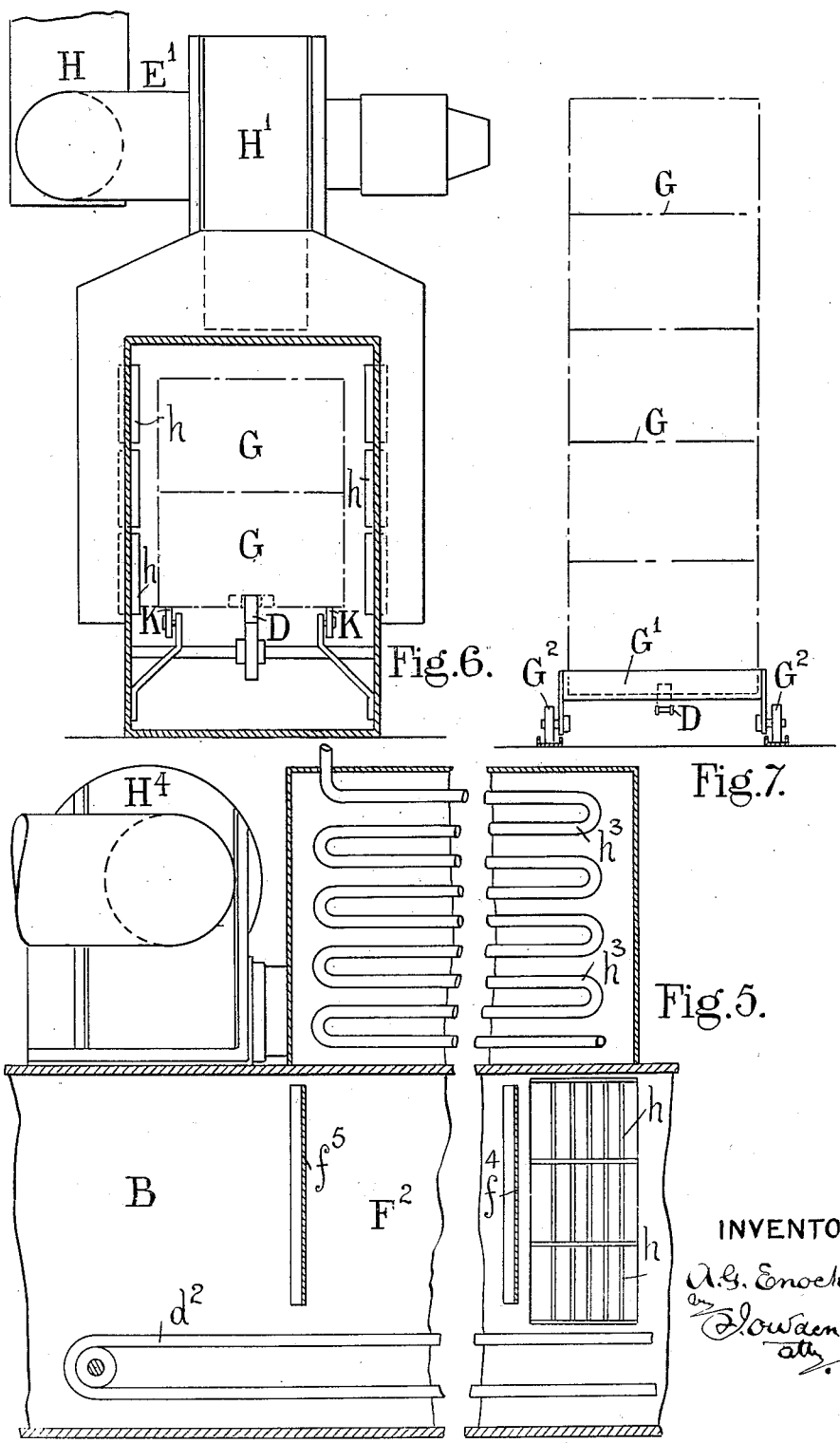

Patented May 7, 1935

2,000,514

UNITED STATES PATENT OFFICE 2,000,514

APPARATUS FOR PASTEURIZING MILK AND OTHER SUBSTANCES

Arthur Guy Enock, Wembley Park, England

Application January 22, 1934, Serial No. 707,700
In Great Britain January 27, 1933

5 Claims. (Cl. 126—272)

The invention relates to apparatus for pasteurizing milk or other liquids or substances in bottles or containers.

Apparatus has been proposed comprising three vertical chambers to contain dry air the first chamber containing air maintained at the required pasteurizing temperature (usually 145° to 150° F.), the second chamber having a current of air at atmospheric temperature circulated therethrough and the third and final chamber having chilled or refrigerated air circulated through it, the bottles or containers being carried through the chambers, either singly or in crates, by conveyers which are moved in an up and down path in the chambers.

The object of the invention is to provide apparatus for carrying out the method of pasteurizing in which the heating, cooling and refrigerating treatment is effected by air alone at various temperatures.

The invention comprises a plurality of chambers in alignment disposed horizontally and maintained at different temperatures through which the bottles or containers, whether singly or in groups, are moved on a horizontal plane, automatic conveyers by which the bottles or containers are moved progressively through the chambers, air locks at the inlet to and outlet from and between the several chambers, doors or shutters to the air locks operated preferably automatically and means adjacent to each of the several chambers to condition the air to raise or lower the temperature and force it into the respective chambers.

The invention will be fully described with reference to the accompanying drawings:—

Figs. 1a and 1b show a side elevation, Fig. 1b being a continuation of Fig. 1a of the apparatus.

Figs. 2a and 2b show a plan of the apparatus.

Figs. 3a and 3b show a longitudinal sectional elevation of the apparatus.

Figs. 4a and 4b show a sectional plan of the apparatus.

Fig. 5 is a sectional elevation of a modified construction of air cooling or refrigerating apparatus.

Fig. 6 is a transverse sectional elevation on line 6—6 of Fig. 1a.

Fig. 7 shows a method of piling up a number of crates G to traverse the chambers.

The apparatus is constructed with three chambers A, B and C in alignment with traversing conveyers D D1 mounted in the bottom of each chamber, apparatus E, E1 for treating and forcing the air and air locks F, F1, F2 to prevent the inrush or outrush of air to or from the respective chambers as the bottles or containers pass into or out of the chambers.

In apparatus for treating single bottles the conveyers may be moving bands upon which the bottles may be placed and in apparatus for treating bottles grouped in crates the conveyers may be endless moving chains constructed with lugs to engage the crates or to engage trolleys upon which the crates or the bottles are loaded.

The heating chamber A is fitted with a steam heating coil $e$ over which air is forced in a closed circuit by a powerful fan $el$ to maintain a constant temperature of 145° to 150° F. in the chamber A the air being continuously circulated through the ducts $e2$. In the base of the chamber A a slowly moving chain conveyer D is mounted by which the crates G containing the bottles of milk are traversed slowly through the chamber.

The cooling chamber B is similar to the chamber A fitted with a slow moving chain conveyer D1 in the base and with apparatus E1 for treating and cooling atmospheric air and forcing it into the chamber.

The apparatus E comprises a number of water cooled baffles H over which the air passes and a powerful fan H1 by which it is forced through louvres $h$ into the chamber to meet the groups of advancing bottles. A second fan H2 forces air in at the other end of the chamber over a fine water spray to cool and damp the air. The cool damp air impinging on the hot bottles from the chamber A sets up a considerable amount of evaporation therefrom with cooling effect. Another fan H3 draws air out of the chamber to assist the current or draught of air through it.

Instead of the water baffles H the air may be refrigerated by being forced in by the fan H4 over a refrigerating coil $h3$ (containing chilled brine) and through the louvres $h$.

An air lock or air chamber F is formed at the entrance to the heating chamber A, by two pairs of swinging doors $f$, $f1$ a second air lock F1 is formed between the chambers A and B by the two pairs of swinging doors $f2$, $f3$ and a third air lock F2 is formed at the exit from the chamber B and between it and the chamber C by the two pairs of swinging doors $f4$, $f5$. The several air locks F, F1, F2 are each fitted with a quick moving conveyer $d$, $d1$, $d2$.

As shown in Fig. 6 the crates G are supported upon or by roller tracks K, upon the rollers of which the crates rest and are moved forward by the conveyer chain D which is provided with suitable lugs to engage the crates. As shown in Fig. 7 the crates G may be traversed upon bogies or trucks G1 which run on castors or wheels G2 in channel or other rails and are moved forward by lug chains D.

A pasteurizing apparatus constructed as hereinbefore described enables the construction of the hot air chamber A to be very much cheapened, as, instead of its being a wrought-iron tanklike apparatus with its complement of bearings, shafts, chains and sprockets, it may be a lightly insulated enclosure constructed with a light frame with fibre cement panels and air space walls or walls packed with some insulating material.

The second chamber B for cooling down the contents by chilled atmospheric air may be an enclosure of cheap material to contain the air as it is circulated.

The third chamber C may simply be in the nature of the ordinary cold storage room in which the milk is stored necessitating no cost beyond that of the cold storage room (which is required in any case) for this third chamber.

Where the ordinary dairy bogies or trolleys are employed a flat course or track is provided in the chambers upon which the ball bearing castors of the bogies or trolleys can roll. The bogies or trolleys are moved through the chambers by chains or worms or other moving apparatus which make contact with the trolleys, just above floor level or alternatively with an extension frame upon the trolleys which may be actuated from the top of the chambers or they may be moved by hand.

The crates G containing the bottles entered through the air lock F are placed on the fast moving conveyer chain $d$ which carries them through the swinging doors or shutters $f$, $f1$ into the heating chamber A and on to the slow moving conveyer D. The first pair of swing doors $f$ close before the second pair of swing doors $f1$ open thus preventing any outrush of heated air. The temperature of the heating chamber A is maintained at 145° to 150° F. by the circulation of the air in a closed circuit therein through the heating apparatus E and steam coils $e$. The crates are picked up by the slow moving conveyer D which traverses them slowly through the chamber retaining them therein for the requisite period of 30 minutes. When the crates G arrive at the exit end of the heating chamber A they are picked up by another fast moving conveyer $d1$ and traversed through the air lock F1 in the same manner as through the airlock F into the cooling chamber B and the doors or shutters act in the same manner. The crates are picked up and traversed by another slow moving conveyer D1 in the same manner as the conveyer D, through the cooling chamber B and are picked up by another fast moving conveyer $d2$ which traverses them through the airlock F2 as previously described. The air is cooled by the refrigerating or cooling apparatus E1 through which atmospheric air is forced by the fan H1. The fast moving conveyer $d2$ deposits the crates G in the chamber C from which they can be transferred by manual or mechanical means into the cold storage to await delivery.

The crates G in their passage through the chambers may be placed upon and/or carried by skid tracks, roller tracks, trucks or bogies according to the space available and the number of crates to be handled. When the crates are carried on trucks or bogies the conveyer lugs contact with them instead of directly with the crates.

The doors or shutters of the air locks may be operated by direct contact with the crates or bogies or by electric or pneumatic devices controlled by contact with the crates or bogies.

What I claim as my invention and desire to protect by Letters Patent is:—

1. Pasteurizing apparatus for liquids in bottles comprising a plurality of chambers in alignment, horizontally disposed and maintained at different temperatures, automatic conveyers by which the bottles are moved progressively through the chambers, air locks at the inlet to and outlet from the apparatus and between the several chambers, said air locks having doors or shutters at each end thereof, further automatic conveyers by which the bottles are traversed between the chambers and means adjacent to each chamber to heat or cool the air and force it into the respective chamber.

2. Pasteurizing apparatus for liquids in bottles comprising a plurality of chambers in alignment, horizontally disposed and maintained at different temperatures, automatic conveyers by which the bottles are moved progressively through the chambers, air locks at the inlet to and outlet from the apparatus and between the several chambers, said air locks having a pair of swinging doors at the inlet to each air lock and a second pair of swinging doors at the outlet from each air lock, and a quick moving conveyer connecting the outlet and inlet swinging doors between the several chambers.

3. Pasteurizing apparatus for liquids in bottles comprising a heating chamber, a cooling chamber and a cold storage chamber horizontally disposed in alignment, automatic conveyers by which the bottles are moved progressively through the chambers, air locks at the inlet to and outlet from the apparatus and between the several chambers, said air locks having doors or shutters at each end thereof, a steam heating coil adjacent the heating chamber, a fan to circulate air through the chamber and over the heating coil and air ducts forming a closed circuit through which the hot air is passed to and from the chamber.

4. Pasteurizing apparatus for liquids in bottles comprising a heating chamber, a cooling chamber and a cold storage chamber horizontally disposed in alignment, automatic conveyers by which the bottles are moved progressively through the chambers, air locks at the inlet to and outlet from the apparatus and between the several chambers, said air locks having doors or shutters at each end thereof, water cooled baffles adjacent the cooling chamber over which air is drawn, a fan to force the air into the chamber, and a second fan to withdraw air from the chamber as it becomes heated.

5. Pasteurizing apparatus as in claim 1 having low speed conveyors by which the bottles are moved through the chambers and high speed conveyers for traversing the bottles through the doors and the air locks to reduce to a minimum the period during which the doors are open.

ARTHUR GUY ENOCK.